US012573359B2

(12) United States Patent

Stauffer

(10) Patent No.: US 12,573,359 B2
(45) Date of Patent: Mar. 10, 2026

(54) INSTRUMENT HOLDER FOR SEATED OR STANDING PLAY

(71) Applicant: David Stauffer, San Leandro, CA (US)

(72) Inventor: David Stauffer, San Leandro, CA (US)

( * ) Notice: Subject to any disclaimer, the term of this patent is extended or adjusted under 35 U.S.C. 154(b) by 236 days.

(21) Appl. No.: 18/532,670

(22) Filed: Dec. 7, 2023

(65) Prior Publication Data

US 2024/0221706 A1 Jul. 4, 2024

Related U.S. Application Data

(60) Provisional application No. 63/436,751, filed on Jan. 3, 2023.

(51) Int. Cl.
*G10G 5/00* (2006.01)

(52) U.S. Cl.
CPC .................................... *G10G 5/005* (2013.01)

(58) Field of Classification Search
CPC ................................ G10G 5/005; G10G 5/00
See application file for complete search history.

(56) References Cited

U.S. PATENT DOCUMENTS 8,969,690 B1 3/2015 Iyer
9,514,721 B1 12/2016 Champion
10,957,289 B2 * 3/2021 Laird ....................... G10D 9/00
2006/0156896 A1 7/2006 Perkins
2020/0090631 A1 3/2020 Feldman

FOREIGN PATENT DOCUMENTS

RU 187379 U1 3/2019

OTHER PUBLICATIONS

International Search Report and Written Opinion in corresponding International Patent Application No. PCT/US2023/082963, dated Mar. 21, 2024.
International Preliminary Report on Patentability from corresponding International Patent Application No. PCT/ US2023/082963 dated Jul. 3, 2025.

* cited by examiner

*Primary Examiner* — Kimberly R Lockett
(74) *Attorney, Agent, or Firm* — Dergosits & Noah LLP; Todd A. Noah

(57) ABSTRACT

An instrument holder having a body with a vertical opening formed through the body for receiving and securing an end pin. The body is attached to the rear portion of a brace or platform, and the instrument rests on the brace and against the body. A support mechanism is attached to the body and includes a curved portion for engaging with the leg of the player of the instrument. An adjustment mechanism is provided for adjusting the height of the end pin and securing the end pin to the body.

19 Claims, 9 Drawing Sheets

INSTRUMENT HOLDER FOR SEATED OR STANDING PLAY

CROSS-REFERENCE

This application claims priority from U.S. Provisional Patent Application No. 63/436,751, filed Jan. 3, 2023, the entire disclosure of which is incorporated herein by reference.

TECHNICAL FIELD

This disclosure relates generally to musical instruments, and more particularly, to an apparatus for holding a stringed instrument for a player in a seated or standing position.

BACKGROUND

The bass guitar is a physically demanding instrument, and extended playing can lead to a variety of repetitive stress injuries. Bass guitar differs from a regular six string guitar in several important ways, for example, the scale length is longer. A standard bass guitar scale (called Long Scale) as popularized by Fender is 34 inches, compared with 24.75 or 25.5 inches for a regular guitar.

The bass guitar is usually held by a strap worn around the player's neck/shoulder/back with the bass guitar neck in a horizontal or slightly inclined position. When the player is seated, the bass guitar body can be rested on the upper leg—usually the right leg for a right-handed player. The left hand has to extend all the way to the end of the neck in order to reach first position. Since the bass guitar usually plays the lowest notes in a song, the player has to keep their left arm extended for long periods of time. This results in fatigue and strain on the left arm, often resulting in shoulder and elbow strain. Further, with the bass guitar neck in a horizontal position, the left hand has to be rotated approximately 90 degrees in order to achieve a good hand position for fretting notes. This results in strain of the left wrist and joints of the left hand. Depending on the height at which a bass is worn, the right hand often is forced to flex down at the wrist by about 90 degrees. The right forearm then rests on the upper body of the bass, which can relieve some strain but also introduces pressure to the forearm. The right elbow is often bent acutely in order to accommodate right hand positioning.

A bass typically weighs between 8 to 10 pounds. That weight is carried by the strap onto just one shoulder—even if using a wide and padded strap, the asymmetrical load on the upper body results in fatigue and strain. This is compounded by the fact that the left arm must be held in an extended position while playing, which can be 3 to 4 hours at a time.

String gauges on a bass are very heavy, and string tension much higher compared with a regular guitar. For example, a low E string on a standard guitar might be around 12 lbs. tension, while the low E string on a bass over 30 lbs. tension. Due to the longer scale and thicker strings, a bass has much higher string action as well. All of this means it requires more force from the left hand to fret a note on bass compared to regular guitar.

Playing an instrument over a long period of time, such as a bass guitar, could lead to series of chronic and painful conditions, such as: pain in both wrists; hand pain; elbow pain; and debilitating shoulder pain. It would be desirable to provide relief for these various physical stresses caused by playing bass guitar. An ideal placement of the bass—in particular the position of neck and fingerboard—that would allow the player to keep both wrists straight and keep elbows from bending more than 90 degrees.

SUMMARY

An instrument holder is disclosed. The instrument holder has a body, with a vertical opening formed through the body for receiving and securing a rigid rod, such as a conventional end pin. An adjustment knob is provided for adjusting the height of the rigid rod and therefore the height of the instrument, and for securing the rigid rod in the desired position. The body is attached to the rear portion of a brace or platform, and the instrument rests on the brace and back against the body. A support mechanism is attached to one side of the body and includes an arm having a curved, concave shape, for engaging with the leg of the instrument player.

For seated play of the instrument, the support mechanism includes a riser arm coupled to extend upward (or downward) from the body and a concave-shaped support arm coupled to and extending laterally from the riser arm. For standing play of the instrument, the support arm is coupled directly to the body, and a support block is coupled to the end of the support arm, the support block also having a curved, concave shape to engage the player's leg.

DETAILED DESCRIPTION

A vertical or near-vertical orientation of the neck of the electric bass makes for much more natural positioning of both hands on the instrument. This disclosure is directed to an instrument holder assembly that allows the instrument to rest on the floor and provides the desirable vertical or near-vertical orientation, thereby keeping the weight of the instrument off the player's shoulder and allowing for more natural hand positioning. The instrument holder is a simple mechanical device that attaches to almost any electric or acoustic bass guitar, usually without requiring any modification to the instrument. Although the described embodiments are for right-handed players, the device is symmetrical and can of course be implemented as a left-handed version.

The instrument holder is made as a body having a vertical opening formed through the body for receiving and securing a rigid "end pin" type rod. A brace is made as a platform for holding the instrument, and the body is coupled on top of the brace at a rear portion of the brace, such that the instrument rests on the brace and back against the body. A support mechanism for engaging with the player of the instrument is attached to one side of the instrument holder body and includes a curved arm, e.g., curved in a concave shape, for engaging with the leg of an instrument player. For seated play of the instrument, the support mechanism includes a riser arm coupled to extend upward from the body and a concave-shaped support arm coupled to and extending laterally from the riser arm. For standing play of the instrument, the support arm is coupled directly to the body, and a support block is coupled to the end of the support arm, the support block also having a curved, concave shape to engage the player's leg.

Figure 1:
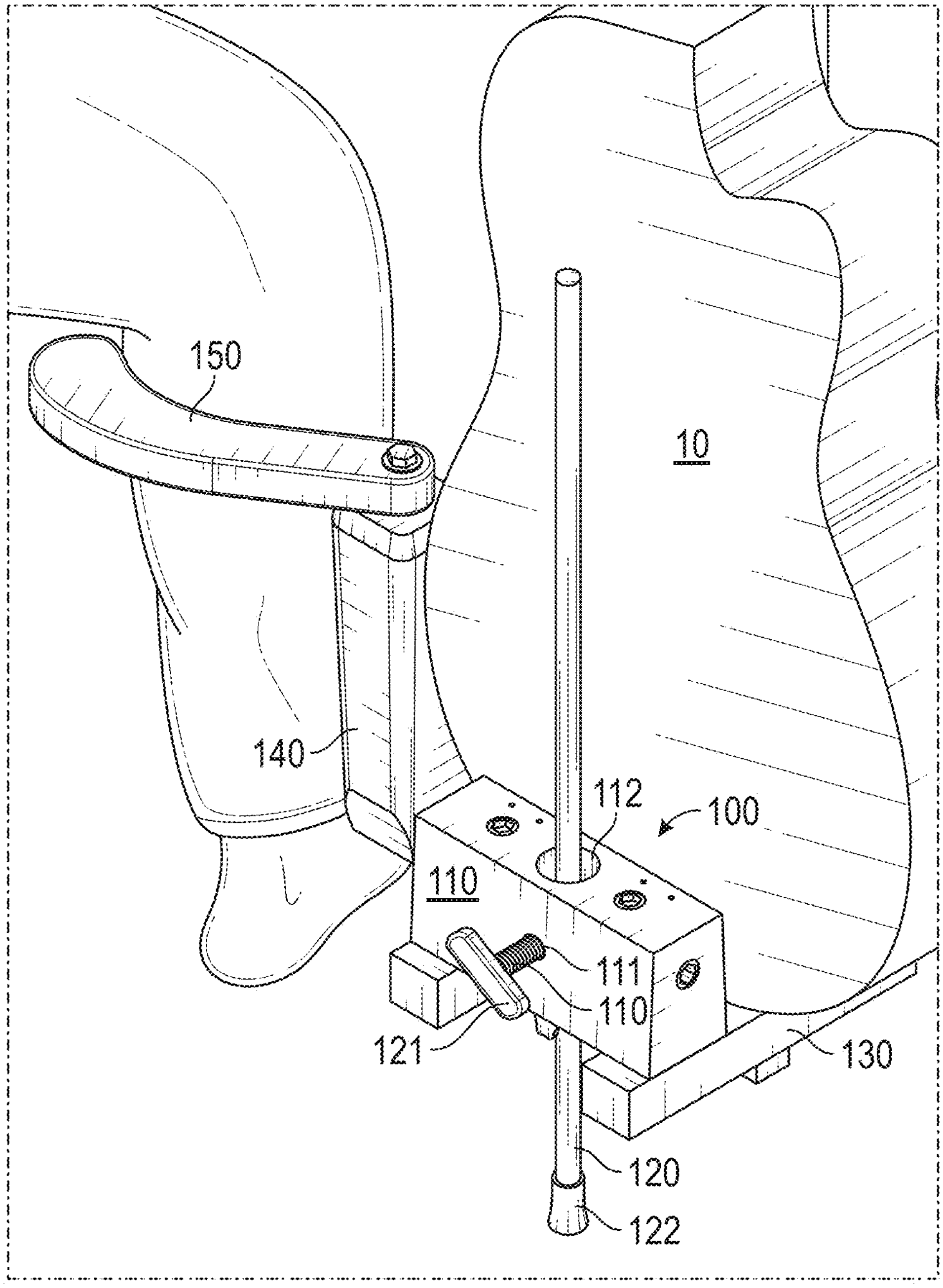
FIG. 1 is a rear perspective view of a first embodiment of an instrument holder holding an instrument adjacent a seated player of the instrument.
Figure 2:
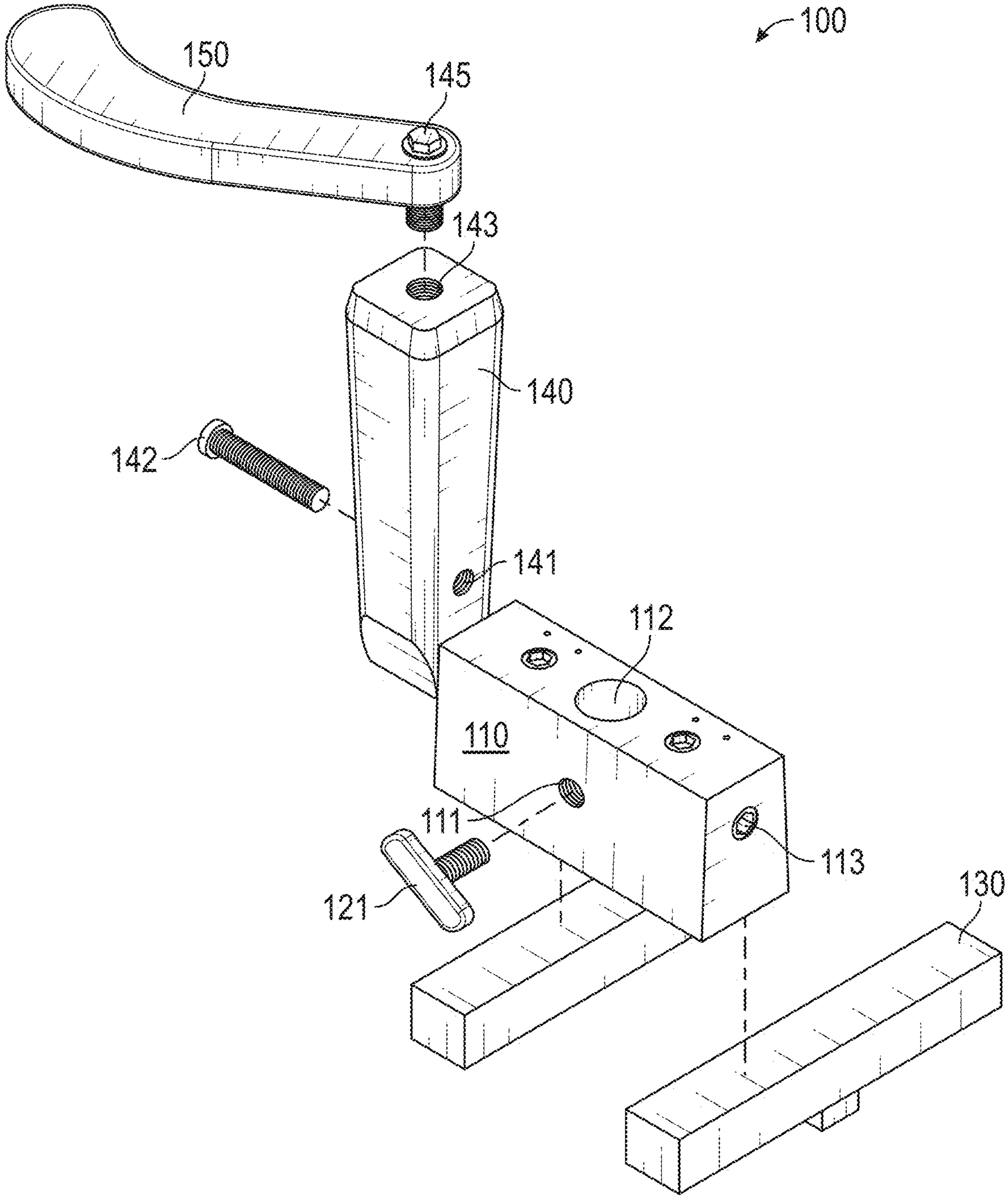
FIG. 2 is a rear perspective exploded view of the instrument holder shown in FIG. 1.
Figure 3:
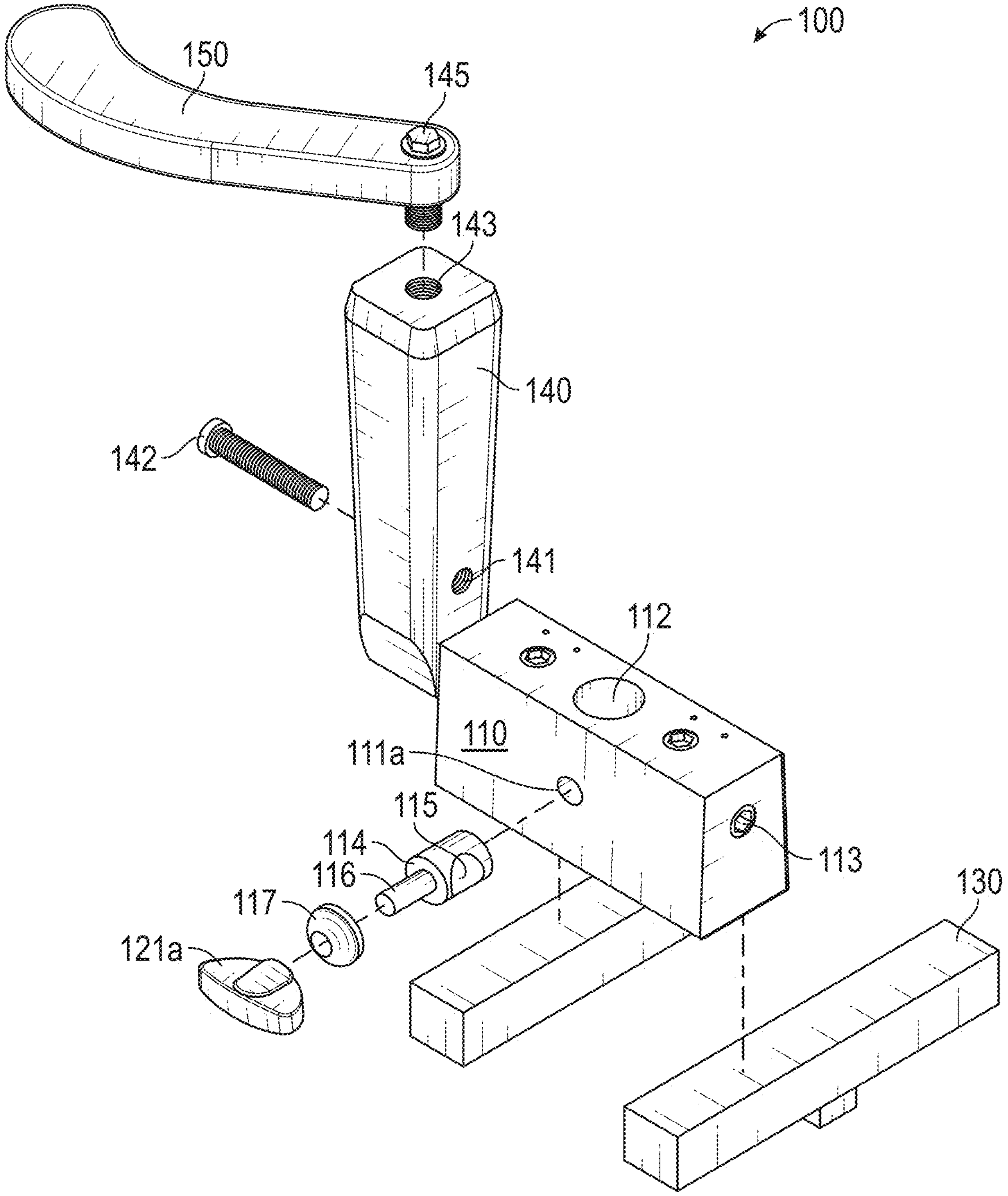
FIG. 3 is a rear perspective exploded view of an alternative embodiment of the instrument holder body shown in FIG. 2.
Figure 4:
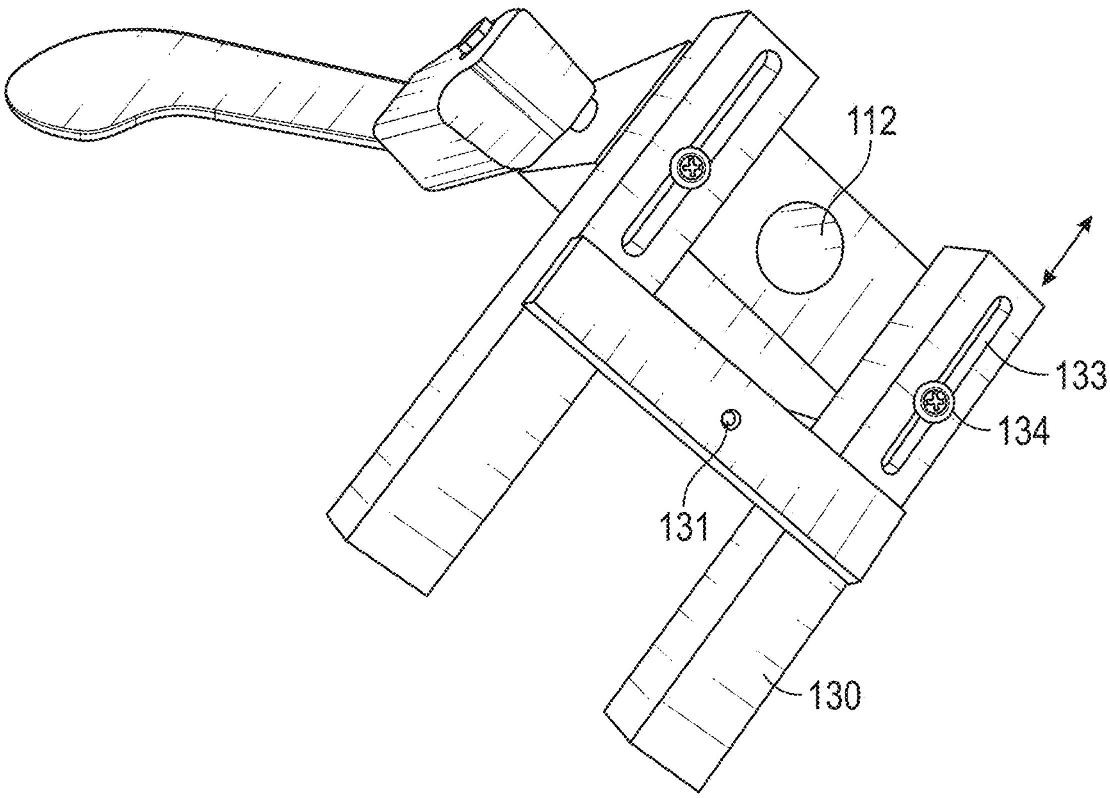
FIG. 4 is a bottom perspective view of the instrument holder shown in FIG. 1.

FIGS. 1-4 illustrate a first embodiment of an instrument holder assembly 100 suitable for playing the bass while sitting. FIG. 1 shows an electric bass instrument 10 resting in the instrument holder 100 and the player seated adjacent the instrument holder, while FIGS. 2-4 show just the instrument holder. The instrument holder 100 includes a body 110 having a center hole 112 formed through the body for receiving therethrough a vertical rod 120, such as a standard cello end pin. The body 110 may be generally rectangular in shape, although in one embodiment, the vertical face of the body adjacent the instrument 10 is cut with a very slight angle, e.g., approximately 1 percent, such that the rod 120 does not stick out from the instrument 10 when retracted. In other embodiments, the body could have other shapes, such as a wedge, a trapezoidal, cylindrical, or kidney-shaped.

In one embodiment, shown in FIG. 3, a hole 111 having internal threads is formed laterally through the body 110 into vertical opening 112. A hand-knob 121 having a threaded stud is provided as a set screw to be used through hole 111 in the body 110 and tightened directly against the endpin 120 to hold it in place. In this embodiment, the endpin 120 is preferably made from steel or a steel alloy. In another embodiment, shown in FIG. 2B, a ring or collar 114 has an opening 115 sized to receive the endpin 120 and a threaded stud 116 extending from the collar. The collar 114 is inserted through the lateral hole **111*a* in the body 110*a* such that opening 115 is oriented vertically to receive the endpin 120. A cover plate 117 is fit over the threaded stud 116 as it extends from the body 110 and a hand-knob 121*a* having internal threads is threaded over the stud in order to allow adjustment of the height of the rod 120 in use through the collar 114 and to use the hand-knob 121 to tighten the collar 114 against the rod to hold the rod in place within the collar. This embodiment is preferred for a carbon fiber rod to avoid abrasion of the endpin 120** by direct contact of the set screw.

A brace 130 is affixed to the bottom of the body 110 with wood screws 134 through elongated channels 133 and the brace attaches to the instrument 10 using the strap pin at the tail end of the instrument (not shown). The brace 130 extends forward laterally from the instrument holder body 110 such that the instrument rests on the brace and against the body, which is affixed to the rear portion of the brace. In this right-handed embodiment, riser arm 140 is attached to the left side of the body 110 and extends upward from the body, and a curved support arm 150 is attached at the top of the riser arm and extends laterally for engaging with the player's leg. The riser arm 140 and support arm 150 would be attached to the right side of the body 110 in a left-handed embodiment.

The components of the instrument holder 100 may be built from wood, and use standard fasteners, glue joints, and wood screws for assembly. Threaded brass inserts are provided where threaded fasteners are used to attach the components to each other. While the instrument holder could be built from any number of materials, wood is most appropriate since the instruments are almost all made from wood, thus making for a holistic extension of the instrument. Natural wood instruments could have an instrument holder made from the same species of wood; painted instruments could have matching or contrasting instrument holder colors.

For acoustic instruments, the body 110 is on the order of inches, and 3 inches tall is a good example for an acoustic instrument, since the force applied to the back of the instrument can be spread over a wider surface, acoustic instruments being more fragile than electric instruments. A shorter body may well be adequate for most electric basses. The sizing can however be optimized as needed for a particular instrument and/or to accommodate the physical requirements of the instrument player, as well as to account for the player's preference with regard to positioning of the instrument. The width of the body 110 for 4-string basses is about 5 inches, although the width dimension can be easily adjusted for instruments having more strings, which will require a wider bridge.

As noted above, the center hole 112 is formed through the body 110 and sized accordingly to receive endpin rod 120. The adjustment knob 121 provides the adjustment/tightening mechanism to set the desired height.

The endpin rod 120 is similar to the standard endpin used, for example, on cellos and bass viols, such that the weight of instrument 10 is ultimately supported by the end pin rod. The endpin rod 120 is a rigid rod typically made of steel, carbon fiber, or titanium, and is adjustable in the vertical direction so that the height of the instrument is in the desired position. Resting on the floor in an orchestra pit, the end of the endpin is typically a hardened steel tip. In most other locations, the end of the endpin is covered with a rubber cup 122.

A shorter endpin can be used for sitting, and a longer one for standing play. Any length rod is fully adjustable for height within the body 110, but if the rod is too long it can interfere with movement of the left-hand during play.

As noted above, in one embodiment the vertical face of the body 110 is slightly angled, which may be best set through a fitting process with the instrument. Alternatively, the angled face may be provided by having the body shaped as a wedge or a trapezoid. Once that angle is set, the bottom of the body 110 is adjusted to an exact 90-degree angle from the angled face. The instrument 10 rests on the brace 130, which is secured through brace hole 131 to the strap pin hole at the tail end of the instrument, for example in a typical installation, with a #6 or #8 truss-headed wood screw measuring between 1¼ and 1¾ inches in length (not shown). A round-headed screw with a washer would also work for most applications; one exception is Rickenbacker basses, in which the strap pin hole is tapped for a machine screw. The brace hole 131 could be implemented as a short channel or slot to allow for movement of the strap pin screw in order to obtain proper positioning of the brace with respect to the front or top of the instrument. The brace 130 is attached to the body 110 of the instrument holder 100 using two wood screws 132 through elongated channels 133 that allow for depth adjustment of the brace so that the body can rest solidly on the bass body. However, an acoustic bass does not require the elongated channels for adjustability since there is no front piece contacting the top of the instrument body, and attachment is very stable due to the wide body of the acoustic bass guitar.

The riser arm 140 can be made to any length, and lengths of 1 inch up to 6 inches may be desirable depending on the instrument and the player. There must be a comfortable distance between the player and the instrument; having the instrument too close results in cramped playing position, and having the instrument too far away results in poor ergonomics. The riser arm 140 can be swiveled upward or downward to meet the preference of the player. A bottom hole 141 is formed through the bottom of the riser arm 140 for securing the riser arm to the body 110 with a threaded fastener 142. Holes 113 are formed on opposite sides of the body 110 for receiving the threaded fastener 142, on the left side for a right-handed player, and on the right side for a left-handed player. The riser arm 140 has a top hole 143 for securing the support arm 150 to the riser arm with threaded fastener 144.

The support arm 150 is made to have a slight curvature so that it comfortably engages with the player's lower leg just below the knee joint. The length and rotatable adjustment of the riser arm 140 allows for the support arm 150 to contact the player's leg at the location preferred by the player. The support arm 150 could be made to any length to accommodate player preferences, but a typical range is between 5 to 8 inches long. In one preferred embodiment for seated play, the support arm 150 is 7 inches long.

For players that prefer the nut of the instrument 10 to be at eye level, the length of the rod 120 can be adjusted accordingly. Then, using various lengths of the riser arm 140, the player can establish a comfortable height for the support arm 150. The support arm 150 swivels to accommodate the player's preference. Depending on the height that a player wants the instrument 10, the riser arm 140 can also be pivoted downwards to allow even more adjustment. The riser arm 140 could be fashioned from inexpensive softwood since there is not much strength needed but could also be made from materials to match the other components of instrument holder.

Figure 5:
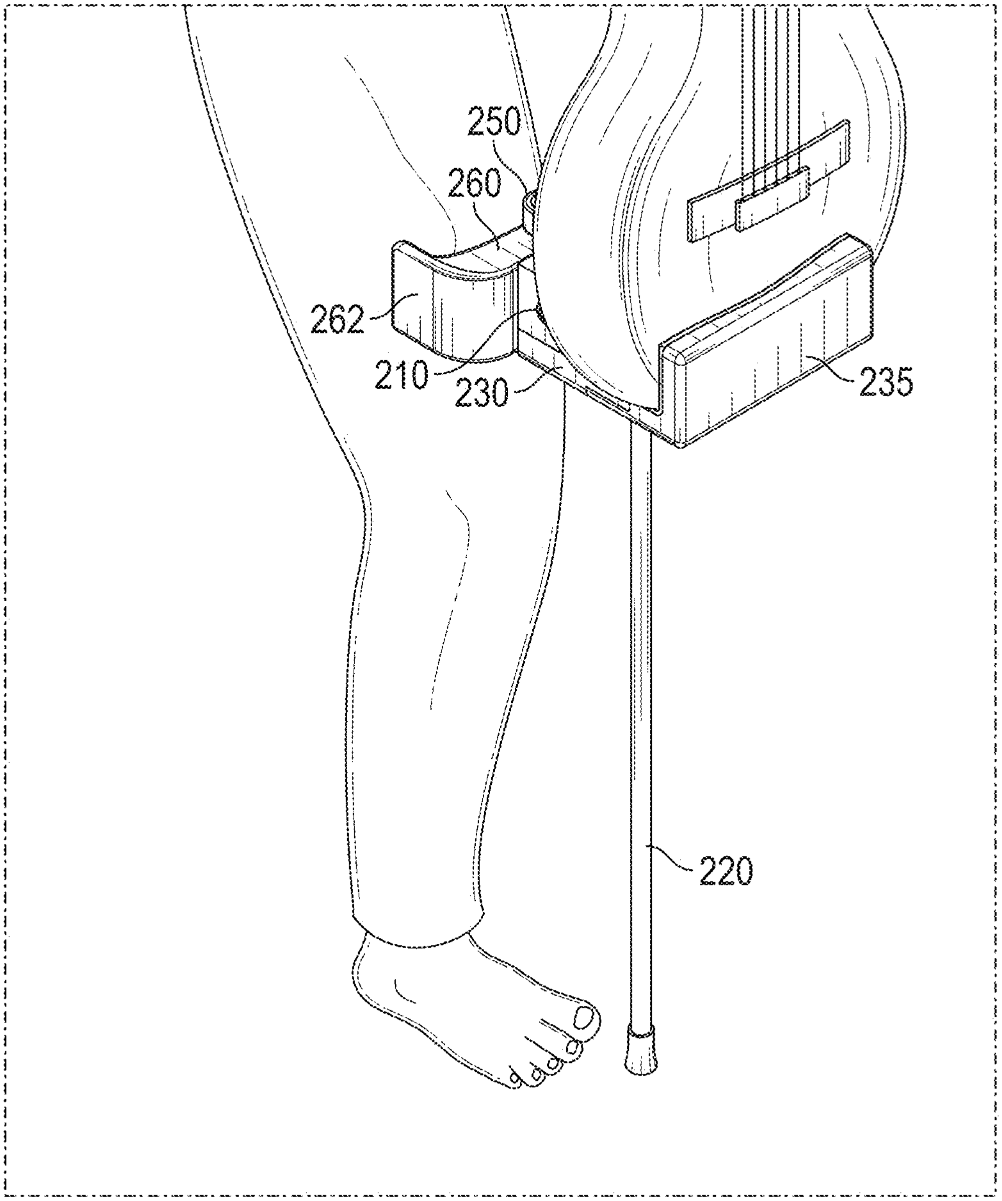
FIG. 5 is a rear perspective view of a second embodiment of an instrument holder holding an instrument adjacent a standing player of the instrument.
Figure 6:
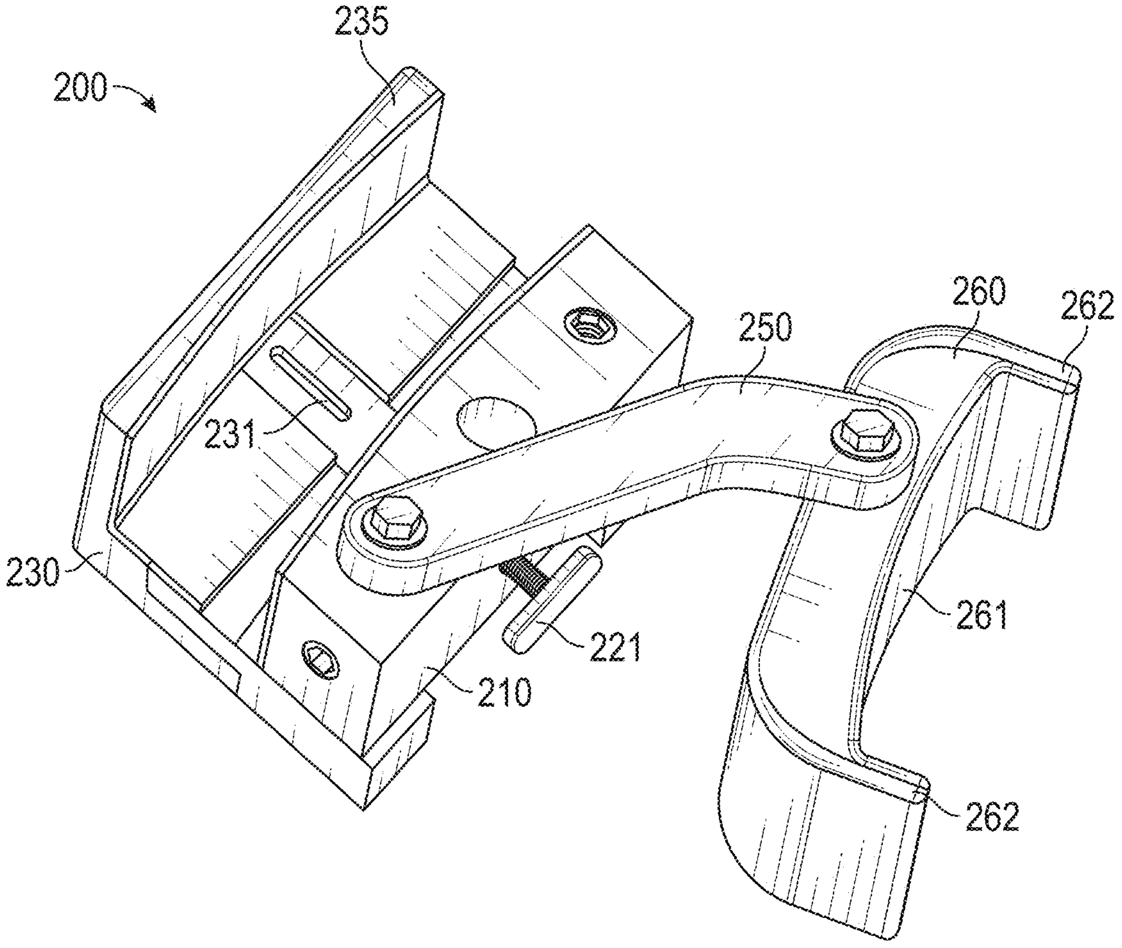
FIG. 6 is a top perspective view of the instrument holder shown in FIG. 5.
Figure 7:
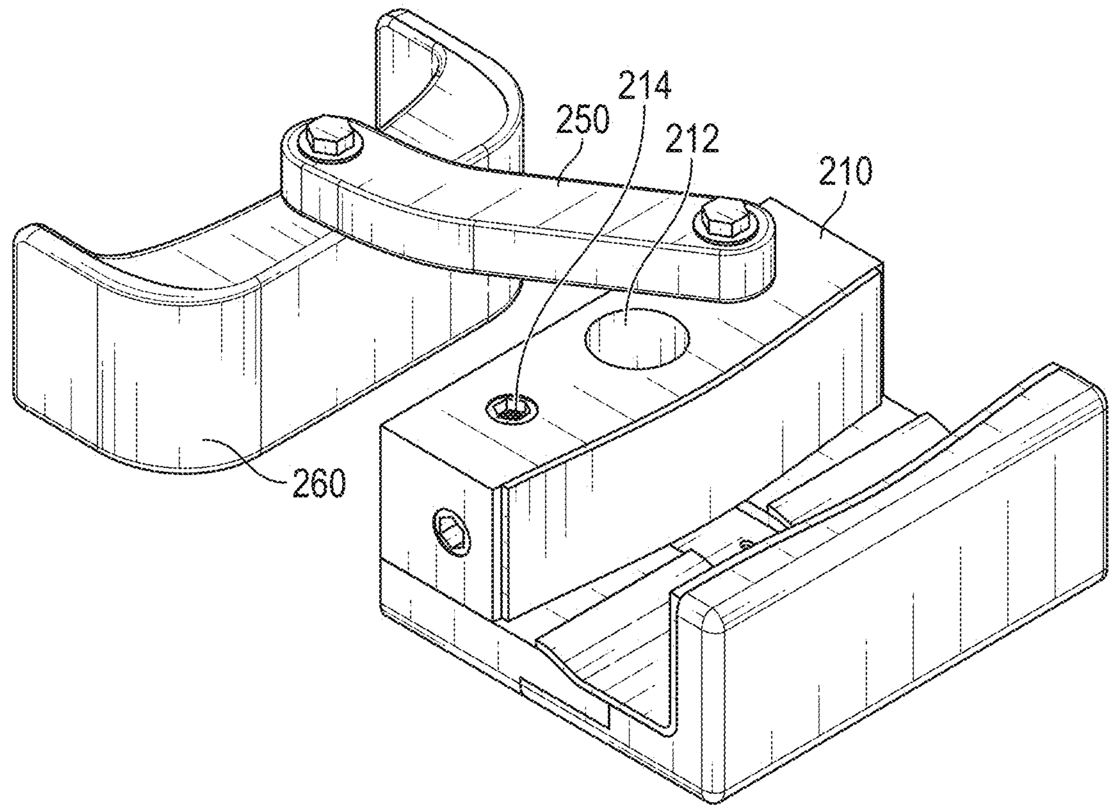
FIG. 7 is a front perspective view of the instrument holder shown in FIG. 5.

Referring now to FIGS. 5-7, a second embodiment illustrates instrument holder 200 for players that prefer standing. FIG. 5 shows an electric bass instrument 10 resting in the instrument holder 200 and the player standing adjacent the instrument holder, while FIGS. 6-7 show just the instrument holder. In this embodiment, the support arm 250 is attached directly to the instrument holder body 210 without the need for a riser arm. Further, a support block 260 is attached at the end of the support arm 250. In one implementation, the support block 260 is a wooden approximately block 3½ inches tall and anywhere from 3 to 5 inches wide. In one implementation, the support block 260 has a slight curvature or concave shape on its inside face 261 to better match the shape of the player's thigh in the quadriceps area, and the support block rests at about the middle of the upper leg. As illustrated, the support block 260 includes wings 262 formed at each end that protrude about one inch. This combination of slight curvature, and a more abrupt edge, provides lateral support for the instrument 10 and prevents rotation of the instrument while playing. The support arm 250 establishes the desired distance between the player and the instrument 10. The adjustment knob 221 is included with the body 210 to adjusting and securing the end pin rod 220.

Figure 8:
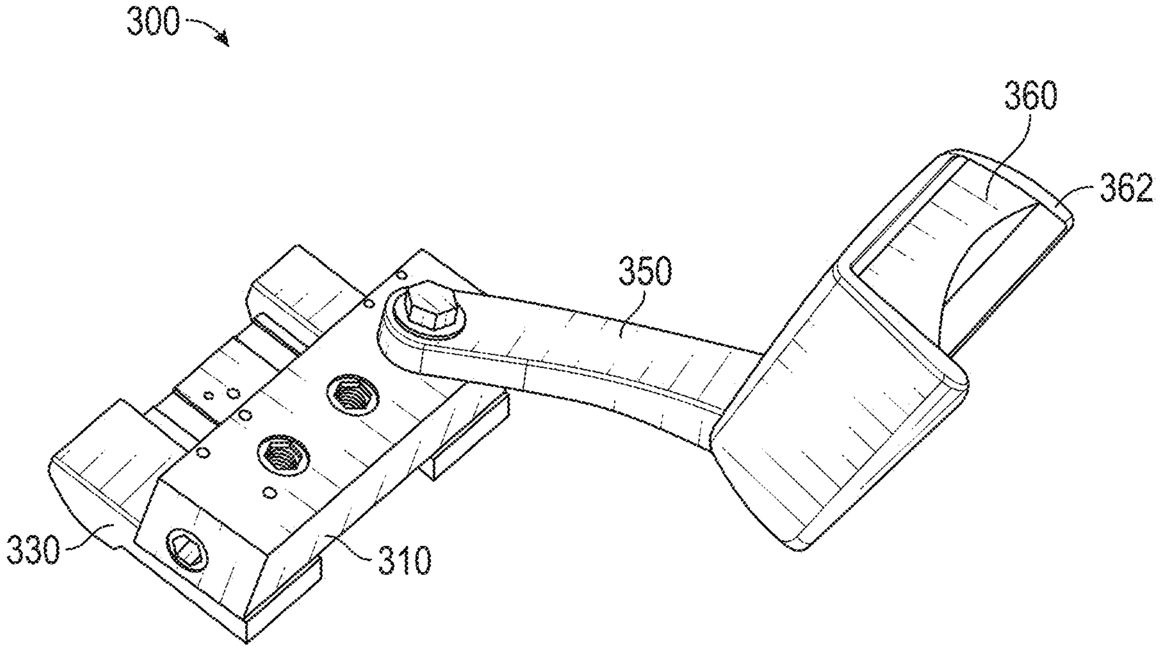
FIG. 8 is a top perspective view of a third embodiment of an instrument holder.

Although in this embodiment the support block 260 is attached to the underside of the support arm 250, it could also be attached on top of the support arm, as shown in FIGS. 7-8, in order to engage higher up on the player's leg. The support block could also be attached to face slightly downward. Further, the support block may be attached on top of the support arm 150 facing down or attached to the bottom of the support arm facing up.

The embodiment illustrated in FIGS. 5-7 is for instruments having a rounded body, for example, Spector electric basses. In this case, body 210 includes a vertical extension 235 of brace 230 that extends upward in front of the instrument and is spaced apart from the body to hold the instrument between the body and the vertical face. Further, the opposing faces of the body 210 and the vertical extension 215 have a contour or curvature designed to match the curvature of the rounded body instrument, which helps to stabilize the instrument holder 200 against the body of the instrument. Alternatively, the body may be made in a kidney shape or similar to provide the curved contour.

Figure 9:
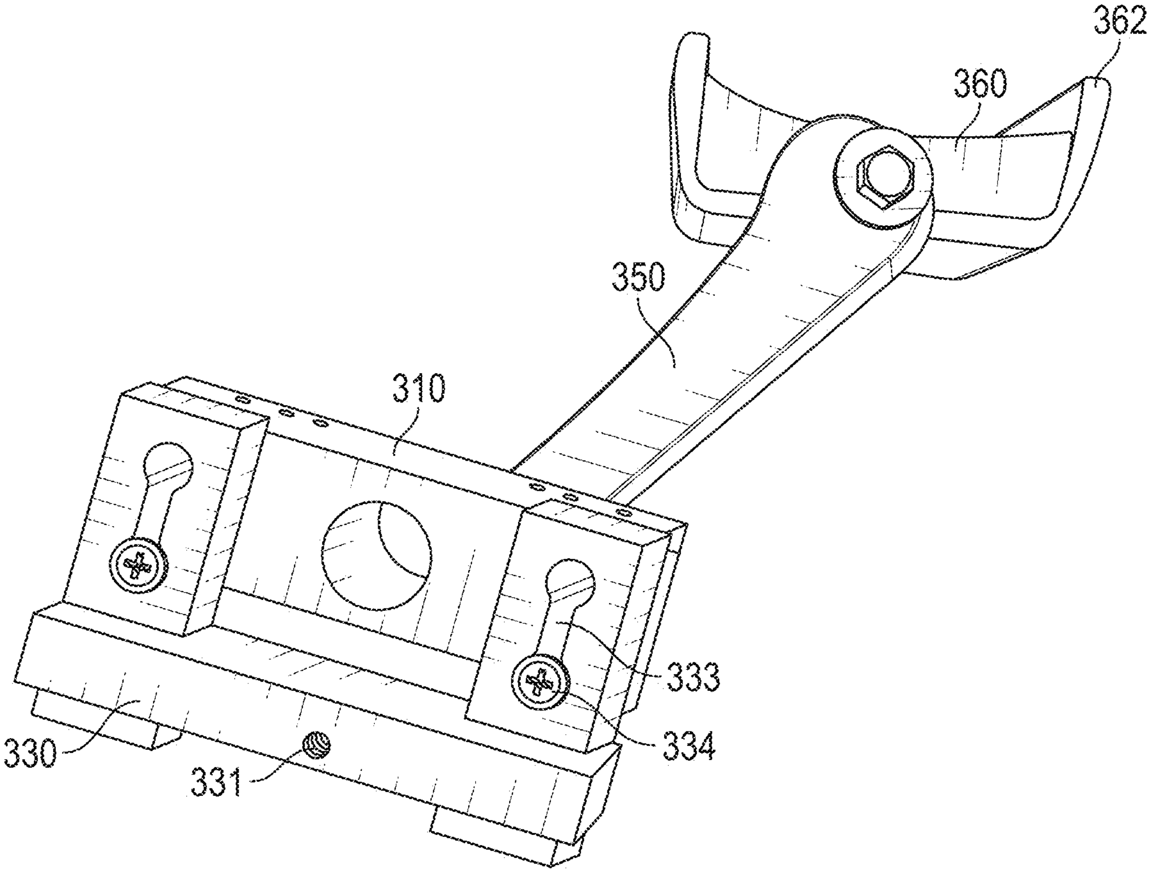
FIG. 9 is a rear perspective view of the instrument holder shown in FIG. 6.

A third embodiment showing instrument holder 300 is provided for standing play and illustrated in FIGS. 8-9. In this embodiment, the body 310 and brace 330 are similar to the first embodiment, and there is no extension of the brace for rounded instruments. Similar to the second embodiment, the support block 360 with wings 362 is attached directly to the support arm 350 but is attached on top of the support arm. Body 310 is attached to the brace 330 with wood screws 334, and the channels 333 in the brace allow for adjustment of the lateral distance between the body and the brace.

While the disclosure has been described in connection with specific embodiments, it is to be understood that the disclosure is not limited to these embodiments, and that alterations, modifications, and variations of these embodiments may be carried out by the skilled person without departing from the scope of the disclosure.

What is claimed is:

1. An instrument holder, comprising:

a body having a vertical face on one side for contacting a back of an instrument and a vertical opening formed through the body for receiving a rigid end pin rod;

a brace attached to an underside of the body and extending forward therefrom for holding the instrument, the brace adapted to attach to a bottom of the instrument; and a support mechanism attached to one side of the body and having a curved arm for engaging a vertically positioned portion of a leg of an instrument player.

2. The instrument holder of claim 1, the support mechanism further comprising:

a riser arm coupled to extend upward from one side of the body; and a support arm coupled to the riser arm and extending laterally from the riser arm, the support arm having a curved shape to engage a leg of the instrument player.

3. The instrument holder of claim 1, the support mechanism further comprising:

a support arm coupled to the body and extending laterally from the body;

a support block coupled to the support arm and having a curved shape to engage a leg of the instrument player.

4. The instrument holder of claim 1, further comprising an adjustment mechanism coupled through the body for adjusting a height of the end pin rod and securing the end pin rod to the body.

5. An instrument holder comprising:

a body having a vertical face on one side for contacting a back of an instrument and a vertical opening formed through the body, the vertical opening configured for receiving a rigid end pin rod;

a brace coupled to an underside of the body and extending forward therefrom for holding the instrument, the brace configured for attachment to a bottom of the instrument;

a riser arm coupled to extend upward from one side of the body; and a support arm rotatably coupled to the riser arm and extending laterally from the riser arm, the support arm having a curved shape to engage a leg of the instrument player.

6. The instrument holder of claim 5, further comprising the riser arm is rotatably coupled to the body.

7. The instrument holder of claim 5, further comprising an adjustment mechanism coupled through the body for adjusting a height of the end pin rod and securing the end pin rod to the body.

8. The instrument holder of claim 5, further comprising the brace having a pair of elongated channels in order to provide adjustable depth for attaching the instrument.

9. The instrument holder of claim 5, further comprising the body having an interior vertical face formed with a small angle extending away from the instrument.

10. The instrument holder of claim 5, the vertical face of the body having a curvature that matches a curvature of the instrument.

11. The instrument holder of claim 10, the brace further comprising a vertical extension spaced apart from the body opposite the vertical face and having a curvature that matches a curvature of the vertical face.

12. An instrument holder comprising:

a body having a vertical face on one side for contacting a back of an instrument and a vertical opening formed through the body, the vertical opening configured for receiving a rigid end pin rod;

a brace coupled to an underside of the body and extending forward therefrom for holding an instrument, the brace configured for attachment to a bottom of an instrument;

a support arm coupled to the body and extending laterally from the body;

a support block coupled to the support arm and having a curved shape to engage a leg of the instrument player.

13. The instrument holder of claim 12, further comprising an adjustment mechanism coupled through the body for adjusting a height of the end pin rod and securing the end pin rod to the body.

14. The instrument holder of claim 12, further comprising the support arm is rotatably coupled to the body.

15. The instrument holder of claim 14, further comprising the support block is rotatably coupled to the support arm.

16. The instrument holder of claim 12, further comprising the brace having a pair of elongated channels in order to provide adjustable depth for attaching the instrument.

17. The instrument holder of claim 12, further comprising the body having an interior vertical face formed with a small angle extending away from the instrument.

18. The instrument holder of claim 12, the vertical face of the body having a curvature that matches a curvature of the instrument.

19. The instrument holder of claim 18, the brace further comprising a vertical extension spaced apart from the body opposite the vertical face and having a curvature that matches a curvature of the vertical face.

* * * * *